(12) United States Patent
Krumveide

(10) Patent No.: US 6,631,696 B2
(45) Date of Patent: Oct. 14, 2003

(54) PET TOY

(75) Inventor: Richard G. Krumveide, Omaha, NE (US)

(73) Assignee: Sergeant's Pet Care Products, Inc., Omaha, NE (US)

(*) Notice: Subject to any disclaimer, the term of this patent is extended or adjusted under 35 U.S.C. 154(b) by 0 days.

(21) Appl. No.: 09/941,087

(22) Filed: Aug. 28, 2001

(65) Prior Publication Data

US 2003/0041810 A1 Mar. 6, 2003

(51) Int. Cl.[7] ............................................... A01K 29/00
(52) U.S. Cl. ...................................................... 119/709
(58) Field of Search ............................... 119/709, 710; 15/189, 229.1

(56) References Cited

U.S. PATENT DOCUMENTS

| | | | | |
|---|---|---|---|---|
| 62,347 A | * | 2/1867 | Link | |
| 1,047,703 A | * | 12/1912 | Rapson | |
| 3,107,651 A | * | 10/1963 | Beck | 119/29 |
| 5,329,881 A | * | 7/1994 | O'Rourke | 119/710 |
| 5,367,986 A | * | 11/1994 | O'Rourke et al. | 119/709 |
| 5,660,576 A | | 8/1997 | Winga | |
| 5,947,060 A | * | 9/1999 | Weinacker | 199/709 |
| 6,044,800 A | * | 4/2000 | Kubo et al. | 119/710 |
| 6,050,224 A | * | 4/2000 | Owens | 119/710 |

* cited by examiner

Primary Examiner—Charles T. Jordan
Assistant Examiner—Bret Hayes
(74) Attorney, Agent, or Firm—Polsinelli Shalton Welte

(57) ABSTRACT

The present invention relates to a pet toy comprised of a plurality of yarn pieces, a flexible elastic band member on which the pieces of yarn are fixedly attached, and a plastic tie member, which holds the pet toy in a ball-like, or other desired shape.

12 Claims, 1 Drawing Sheet

PET TOY

FIELD OF INVENTION

The present invention relates to a string pet toy. In particular, the present invention relates to a string pet toy, whereby yarn or fibers are affixed to a band member.

BACKGROUND OF INVENTION

Pet toys made of string, or yarn, have been known. Dogs, in particular, like to play with string pet toys, which generally have a ball-like shape and can be readily chewed. String toys are particularly desired for dogs because they absorb human scent, which is known to comfort dogs. String pet toys are soft and lightweight. Also, if a dog happens to swallow some of the string fibers, no harm will come to the dog. Importantly, such toys are safe.

Traditionally, such pet toys have been known as a FLUMP™. To manufacture these pet toys, it has been known to arrange pieces of cotton yarn proximal to one another. The pieces are arranged side by side. An amount of glue is then applied across the aligned cotton yarn pieces. The fiber, or yarn, pieces are pressed together so that the middle portion of the pieces is contacted with one another. The pieces are then secured by a plastic band or a tie affixed to the middle of the pieces. The glue will harden to hold the fibers in place along with the plastic band. It is known that the glue often degrades allowing the toy to be easily torn apart. A dog playing with the toy can pull individual strands of fiber, or yarn pieces, away from the toy. This is disadvantageous because yarn is then scattered. Also, while the glue may be non-toxic, it is still preferred that an animal not eat or swallow any extraneous pieces of dried glue.

As such, it is desired to have a string pet toy, which is not easily torn apart. More particularly, it is desired to have a toy that can withstand the wear and tear associated with a dog chewing and playing with such toy. It is further desired that such toy not contain glue, which the dog could ingest.

SUMMARY OF INVENTION

The present invention relates to a pet toy formed from a plurality of fibers fixedly attached to a substrate, preferably a flexible band. The substrate or band is then rolled into a coil shape, followed by affixing a plastic band or tie member around the coiled member, and securing the plastic band or tie. A resultant pet toy is formed that generally has a ball shape; however, other shapes may be formed. Preferably, the fibers are pieces of yarn, which can be sewn onto the flexible band. This will prevent the yarn pieces, or fibers, from being readily torn away from, or detached from, the pet toy. The plastic tie member should be made from a flexible plastic, which can be secured and tightened.

The present invention is advantageous because the pieces of fiber, or yarn, are not readily detached from the pet toy. Additionally, sewing the fibers onto the flexible band is advantageous because this prevents the use of glue. Sewing is a stronger way of affixing the fibers to the band, and it prevents the animal from swallowing dried glue. The present invention is also advantageous because a substrate member is used to fixedly attach the pieces of yarn. Previously, a substrate member was not used but, instead, the yarn pieces were glued to one another. This did not provide for a significant holding effect.

DETAILED DESCRIPTION

Figure 1:
FIG. 1 is a top perspective view of the yarn pieces, with a band member laid across the yarn pieces.
Figure 3:
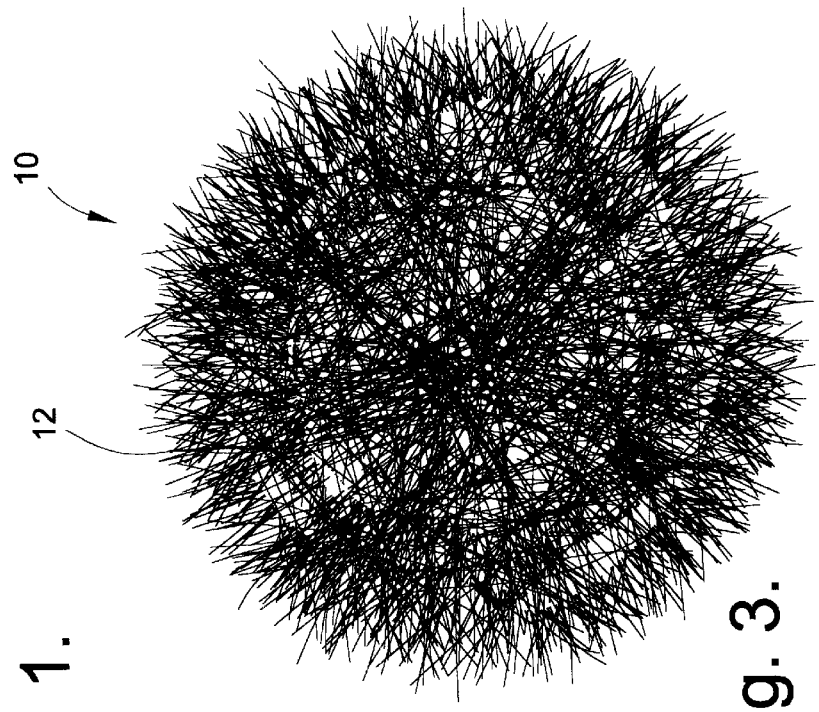

The present invention relates to a pet toy 10, shown in FIG. 3, comprised of a plurality of fibers or strings 12, affixed to and held in proximity by a band or substrate member 14, shown in FIG. 1. In particular, the present invention relates to a pet toy 10, whereby a plurality of fibers or strings 12 are sewn onto the band or substrate member 14. The band or substrate member 14 is then rolled into a coiled shape, shown in FIG. 2. A plastic tie member 16 is affixed around the rolled-up band and tightened. This forms the string pet toy 10.

Any of a variety of non-toxic fibers or strings 12 may be used to form the pet toy 10. It is preferred to use natural fibers, such as cotton fibers. Synthetic, non-toxic fibers, however, may also be used. The fibers or strings 12 used in the toy can be individual strands, or the fibers can be loosely attached and bunched together (yarn). Any of a variety of fiber and yarn gauge sizes may be used. The fibers should have sufficient durability to withstand chewing. Preferably, the fibers are pieces of yarn cut into uniform lengths and arranged in a side by side arrangement. The length of the yarn or fibers can range between about 0.5 inches and about 10 inches. More particularly, the yarn or fibers should have a length ranging between 1 inch and 5 inches. The yarn will preferably have a thread count between 4 to 16 singles. It is preferred that the pieces of yarn or fibers are colored so that the pet toy is available in a variety of different colors. It is also preferred that the pet toy be comprised of more than one color of yarn. All colored fibers will be colorfast.

The number of pieces of yarn, fibers, or string 12 required to form the toy 10 is dependent, in part, upon the gauge size of the yarn. Enough pieces should be used to create a ball.

As stated, the fibers, or pieces of yarn or string 12, are arranged in a side by side arrangement. A band or substrate member 14 is then contacted with the pieces of yarn. The substrate member 14 will be fixedly attached to the pieces. Preferably, the substrate member 14 is a band or strip member that is laid over and across the fibers or string 12 so that it is perpendicular to the fibers, shown in FIG. 1. The band is substantially centered across the fibers. The band or substrate has a length ranging between 0.5 inches and 5 feet. More preferably, the band or substrate has a length ranging between 3 feet and 4 feet, if used to form a dog toy. If the band or substrate is used to form a cat toy, the length will be shorter. The length of the band will vary, depending upon the animal intended to play with the toy. The band or substrate will have a width equal to between about 0.25 inches and 0.75 inches. The band or substrate can be made from cloth, or any other flexible, non-toxic material that can be sewn.

Once centered and in place, the fibers or strings 12 are then fixedly attached to the band or substrate member 14, preferably a band. Any type of fixed attachment may be used; however, it is most preferred for the band or substrate to be sewn onto the fibers or strings. The stitching 18 is shown in FIG. 1. This is particularly advantageous because the fibers cannot be readily separated or torn away from the band during use.

Figure 2:
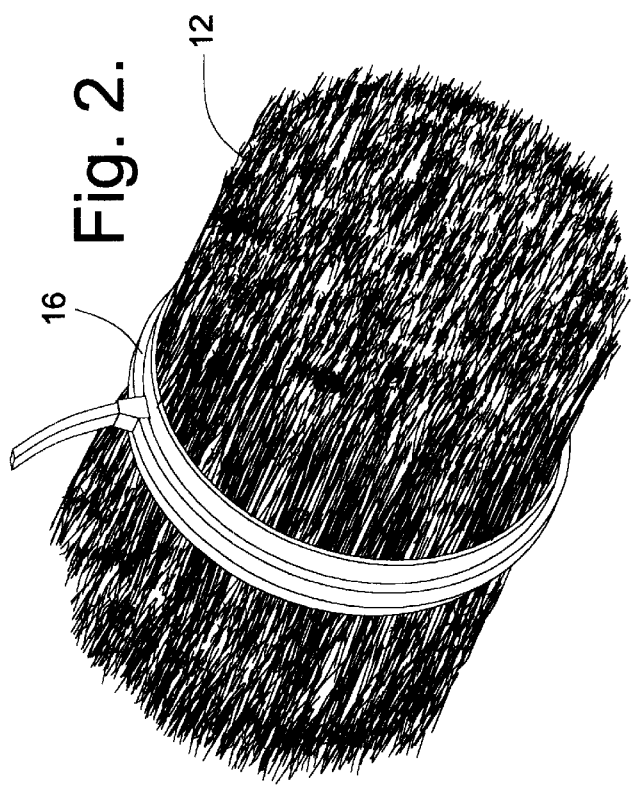
FIG. 2 is a side perspective view of the yarn pieces rolled into a coiled arrangement, with an plastic tie wrapped around the yarn pieces; and, FIG. 3 is a perspective view of the string pet toy.

Once the fibers or strings 12 are sewn onto the band or substrate 14, the arrangement is then rolled lengthwise into a coil, as shown in FIG. 2. A plastic tie 16 or similar member for holding the fibers in the coiled arrangement is then positioned over the band. After positioning, the plastic tie 16 is tightened into position. This will compress the fibers inward, forming a fluffy ball 10. The plastic tie 16 can be any of a variety of members that hold the fibers and band in a coiled arrangement. Preferably, the plastic tie 16 is a coil tie or similar member; however, any device can be used that prevents the band from being uncoiled. The plastic tie 16 should be non-toxic. The length of the elastic tie 16 ranges between 2 inches and 22 inches. The most preferred tie is a 120# electrical fast tie.

The resultant ball 10 has a diameter ranging between 1.75 inches and 10 inches. More preferably, the resultant ball 10 has a diameter equal to between about 5 inches and 6 inches. Other diameters may be selected, dependent upon the animal intended to use the toy. Additionally, while a ball shape is preferred, other shapes may be used. Oblong and football shapes may be used.

Thus, there has been shown and described a pet toy which fulfills all the objects and advantages sought therefore. It is apparent to those skilled in the art, however, that many changes, variations, modifications, and other uses and applications for the pet toy are possible, and also such changes, variations, modifications, and other uses and applications which do not depart from the spirit and scope of the invention are deemed to be covered by the invention, which is limited only by the claims which follow.

What is claimed is:

1. A pet toy comprising:
  (a) a plurality of fibers;
  (b) a band configured for supporting said fibers, said fibers fixedly attached to said band to form a sheet-like member;
  (c) said sheet-like member rolled into a coil; and
  (d) a plastic tie in communication with said band and configured for securing said to compress said fibers into a ball-like member with said plastic tie hidden from view.

2. The toy of claim 1 wherein said fibers being fixedly attached to said band are sewn onto said band.

3. The toy of claim 1 wherein said fibers are available in a multitude of colors.

4. The toy of claim 1 wherein said fibers have a length ranging between 0.5 inches and 10 inches.

5. The toy of claim 4 wherein said fibers have a length ranging between 1 inch and 5 inches.

6. The toy of claim 1 wherein said band has a length ranging between 0.5 inches and five feet.

7. The toy of claim 6 wherein said band has a length ranging between three feet and four feet.

8. The toy of claim 1 wherein said band has a width equal to between about 0.25 inches and 0.75 inches.

9. The toy of claim 1 wherein said fibers are pieces of yarn.

10. The toy of claim 9 wherein said yarn has a thread count ranging between 4 and 16 singles.

11. A pet toy comprising:
  (a) a plurality of fibers, wherein said fibers have a length ranging between approximately 1 inch and approximately 10 inches, and said fibers include pieces of yarn;
  (b) a band configured for supporting said fibers to form a sheet-like member, said fibers being fixedly attached to said band, wherein said band has a length ranging between approximately three feet and approximately four feet, said band having said fibers fixedly attached being rolled into a coil; and,
  (c) a plastic tie in communication with said band and configured for securing said coil, to compress said fibers into a ball-like member with said plastic tie hidden from view.

12. The toy of claim 11 wherein said fibers being fixedly attached to said band are sewn onto said band.

* * * * *

UNITED STATES PATENT AND TRADEMARK OFFICE
CERTIFICATE OF CORRECTION

PATENT NO. : 6,631,696 B2
DATED : October 14, 2003
INVENTOR(S) : Richard G. Krumveide It is certified that error appears in the above-identified patent and that said Letters Patent is hereby corrected as shown below:

Column 3,
Line 35, after the word "said", insert the word -- coil --.

Column 4,
Line 22, delete the word "include" and insert the word -- are -- therefor.

Signed and Sealed this

Second Day of March, 2004

JON W. DUDAS
*Acting Director of the United States Patent and Trademark Office*